United States Patent
Morgan, Jr.

(10) Patent No.: US 11,564,383 B2
(45) Date of Patent: Jan. 31, 2023

(54) FISH ALERT TOOL

(71) Applicant: Arthur Dayle Morgan, Jr., Rosharon, TX (US)

(72) Inventor: Arthur Dayle Morgan, Jr., Rosharon, TX (US)

(73) Assignee: Arthur Dayle Morgan, Rosharon, TX (US)

( * ) Notice: Subject to any disclaimer, the term of this patent is extended or adjusted under 35 U.S.C. 154(b) by 0 days.

(21) Appl. No.: 17/202,038

(22) Filed: Mar. 15, 2021

(65) Prior Publication Data
US 2022/0287286 A1 Sep. 15, 2022

(51) Int. Cl.
*A01K 97/12* (2006.01)
*A01K 97/10* (2006.01)
*G08B 3/00* (2006.01)
*G08B 5/00* (2006.01)

(52) U.S. Cl.
CPC ............ *A01K 97/125* (2013.01); *A01K 97/10* (2013.01); *G08B 3/00* (2013.01); *G08B 5/00* (2013.01)

(58) Field of Classification Search
CPC ...... A01K 97/125; A01K 97/10; A01K 97/12; G08B 3/00; G08B 5/00
USPC ............................................................. 43/17
See application file for complete search history.

(56) References Cited

U.S. PATENT DOCUMENTS

| | | | | |
|---|---|---|---|---|
| 1,267,248 A | * | 5/1918 | Monighan | A01K 97/125 43/17 |
| 1,330,314 A | * | 2/1920 | Gott | A01K 97/12 43/17 |
| 2,816,388 A | * | 12/1957 | Hartley | A01K 97/10 D22/148 |
| 3,020,664 A | * | 2/1962 | Snyder | A01K 97/125 43/17 |
| 3,298,126 A | * | 1/1967 | White | A01K 97/12 43/17 |
| 3,646,697 A | * | 3/1972 | Jennings | A01K 97/10 43/17 |
| 4,202,125 A | * | 5/1980 | Kovacs | A01K 97/10 43/17 |
| 4,240,221 A | * | 12/1980 | Komarnicki | A01K 97/10 43/17 |
| 4,506,468 A | * | 3/1985 | Willhite | A01K 97/10 43/17 |
| 4,510,709 A | * | 4/1985 | Melcher | A01K 97/10 43/17 |
| 4,590,701 A | * | 5/1986 | Rivers | A01K 97/10 43/17 |
| 4,660,317 A | * | 4/1987 | Evans | A01K 91/065 43/26.1 |
| 4,731,947 A | * | 3/1988 | Hart | A01K 97/10 248/514 |
| 5,228,228 A | * | 7/1993 | Meissner | A01K 97/125 43/25 |
| 5,269,088 A | * | 12/1993 | Slaback, Jr. | A01K 97/12 43/17 |

(Continued)

*Primary Examiner* — Christopher P Ellis
(74) *Attorney, Agent, or Firm* — Sheppard Mullin Richter & Hampton LLP (57) ABSTRACT

Common practices in fishing makes it difficult for people to notice when a fish strikes. To address these and other problems associated with common practices in fishing, a fish alert tool can be configured to generate an alert when a fish strikes. The fish alert tool can include a holder for a fishing pole and a spike that is connected to the holder and supports the holder from the ground. The fish alert tool can also include an alarm that generates the alert when the fish strike is detected.

20 Claims, 7 Drawing Sheets

(56) References Cited

U.S. PATENT DOCUMENTS

| | | | | |
|---|---|---|---|---|
| 6,634,134 B1* | 10/2003 | Nyquist | ................. | A01K 97/10 43/16 |
| 6,651,374 B1* | 11/2003 | Ridlen | .................... | A01K 97/10 248/514 |
| 7,434,348 B1* | 10/2008 | Welch | .................... | A01K 97/10 43/17 |
| 8,756,854 B1* | 6/2014 | Michaels | ................ | A01K 97/01 43/17 |
| 10,154,659 B2* | 12/2018 | Smith | .................... | A01K 97/10 |
| 10,798,931 B1* | 10/2020 | Canny | .................... | A01K 97/10 |
| 2002/0113710 A1* | 8/2002 | Brake | .................. | A01K 97/125 340/573.2 |
| 2004/0237374 A1* | 12/2004 | Klein | .................... | A01K 97/01 43/21.2 |
| 2006/0130387 A1* | 6/2006 | Shumansky | ......... | A01K 97/125 43/17 |
| 2007/0266615 A1* | 11/2007 | Norman | ............... | A01K 91/065 43/19.2 |
| 2009/0031609 A1* | 2/2009 | Kirby | .................... | A01K 97/10 43/17 |
| 2012/0204469 A1* | 8/2012 | Kowalski | ............... | A01K 97/10 43/17.5 |
| 2014/0090287 A1* | 4/2014 | Olson | .................... | A01K 97/12 43/17 |
| 2014/0352196 A1* | 12/2014 | Copeland | ................ | E02D 5/801 43/17 |
| 2015/0230447 A1* | 8/2015 | Keossian | ............... | A01K 97/10 43/17 |
| 2021/0352883 A1* | 11/2021 | Zhu | ........................ | A01K 97/10 |

\* cited by examiner

FISH ALERT TOOL

FIELD OF THE INVENTION

The present technology generally relates to fishing accessories. In particular, the present technology provides for a fish alert tool that can hold a fishing pole and generate an alert when a fish strikes.

BACKGROUND

Fishing poles are commonly utilized in a variety of fishing techniques for catching a variety of fish. As these fishing techniques become more advanced, fishing poles have likewise become more specialized as they are adapted for these advanced fishing techniques. As a result, fishing poles are available in a wide variety of sizes, actions, lengths, and configurations. Fishing poles are also made from a wide variety of materials. While several advances have been made in the design and manufacture of fishing poles, advances in fishing accessories have been lacking.

SUMMARY

Various embodiments of the present technology can include a device configured to generate an alert when a fish strikes. The device can comprise a plate that supports a fishing pole, a detector that detects a fish strike based on a press from the plate, and an alarm that generates an alert in response to the fish strike detected by the detector.

In an embodiment, the device further comprises a holder where the fishing pole is placed, and wherein the plate, the detector, and the alarm are attached to the holder.

In an embodiment, the holder has a cylindrical shape with two openings, and wherein one of the two openings extends along the side of the cylindrical shape.

In an embodiment, the device further comprises a spike that is attached to the holder by at least one fastener.

In an embodiment, the spike is removeable from the holder and re-attachable to the holder, wherein the spike is re-attachable in a first configuration wherein the spike is oriented along the length of the holder or a second configuration wherein the spike extends from the holder.

In an embodiment, the spike and the plate are attached to the holder by the at least one fastener.

In an embodiment, the device further comprises one or more supporting legs and a harness that supports the holder.

In an embodiment, the harness comprises one or more extrusions that hold the holder while the holder is supported.

In an embodiment, the device further comprises an adjustable tensioner that adjusts a distance between the plate and the detector, wherein the adjustable tensioner is attached to the holder.

In an embodiment, the distance between the plate and the detector is adjusted by turning the adjustable tensioner.

In an embodiment, a sensitivity of the detector corresponds with the distance between the plate and the detector.

In an embodiment, the alarm continues to generate the alert while the plate presses on the detector.

In an embodiment, the alarm comprises a battery, an on-off switch, and at least one of: an audible alarm or a visual alarm.

In an embodiment, the battery, the on-off switch, and the at least one of: the audible alarm or the visual alarm, are wired in a circuit with the detector.

In an embodiment, the audible alarm generates at least one of: a beep, a whistle, or a bell sound.

In an embodiment, the visual alarm generates a flashing light.

In an embodiment, the detector comprises a push button. The fish strike is detected based on a press on the push button from the plate.

In an embodiment, the plate presses on the detector based on a pull from the fish strike on a tip of the fishing pole.

The figures depict various embodiments of the present technology for purposes of illustration only, wherein the figures use like reference numerals to identify like elements. One skilled in the art will readily recognize from the following discussion that alternative embodiments of the structures and methods illustrated in the figures can be employed without departing from the principles of the present technology described herein.

DETAILED DESCRIPTION

Today, fishing is a popular activity enjoyed by many people. For some people, fishing is an exciting activity when they are reeling in fish, battling to bring in the fish with their fishing poles. For some people, fishing is also a relaxing activity. While waiting for fish to strike, people can relax and peacefully enjoy being outdoors. Fishing is a popular activity for many reasons, but for most people, holding a fishing pole while waiting for a fish to strike is not a particularly enjoyable part of fishing. In fact, it is common practice for people to cast their fishing poles and then leave their fishing poles propped against a rock or a cooler. However, this common practice makes it difficult for people to notice when a fish strikes. If the fish strikes without anyone noticing, then it is likely that the fish will escape without being caught. In some cases, a long period of time may pass before a fish strikes, making it more likely that the fish will escape without being caught. Thus, the common practice of casting a fishing pole and then leaving the fishing pole is problematic and detracts from enjoyment of fishing. Thus, there is a need for an improved approach to identifying when a fish strikes.

An improved approach in accordance with the present technology provides for a device that generates an alert when a fish strikes. In various embodiments, a fish alert tool that includes a holder (e.g., tube) for a fishing pole. The fish alert tool can include an attachment (e.g., spike) that is connected to the holder and allows the holder to support the fishing pole from the ground. The fish alert tool can also include an alarm that generates a visual alert or an audio alert when a fish strikes. The alarm can generate the visual alert or the audio alert based on a plate, with an adjustable tensioner, that contacts a strike detector. The strike detector can be attached to a visual alert generator or an audio alert generator. When a fish strikes and pulls on the fishing pole, the plate can press on the strike detector and trigger the visual alert generator or the audio alert generator, which generates the visual alert or the audio alert. For example, a user can place a fish alert tool in the ground using a spike on the fish alert tool. The user can then cast a fishing pole with bait or a lure. After the user casts the fishing pole, the user can place the fishing pole in a holder of the fish alert tool. The user can adjust an adjustable tensioner on the fish alert tool as necessary. Once the fishing pole is set in the fish alert tool, the user can step away from the fish alert tool. When a fish strikes, the fish alert tool generates an audible alert and a visual alert in response to the fish strike. The audible alert and the visual alert can notify the user of the fish strike. The user can then remove the fishing pole from the fish alert tool and reel in the fish. More details relating to the present technology are provided below.

Figure 1:
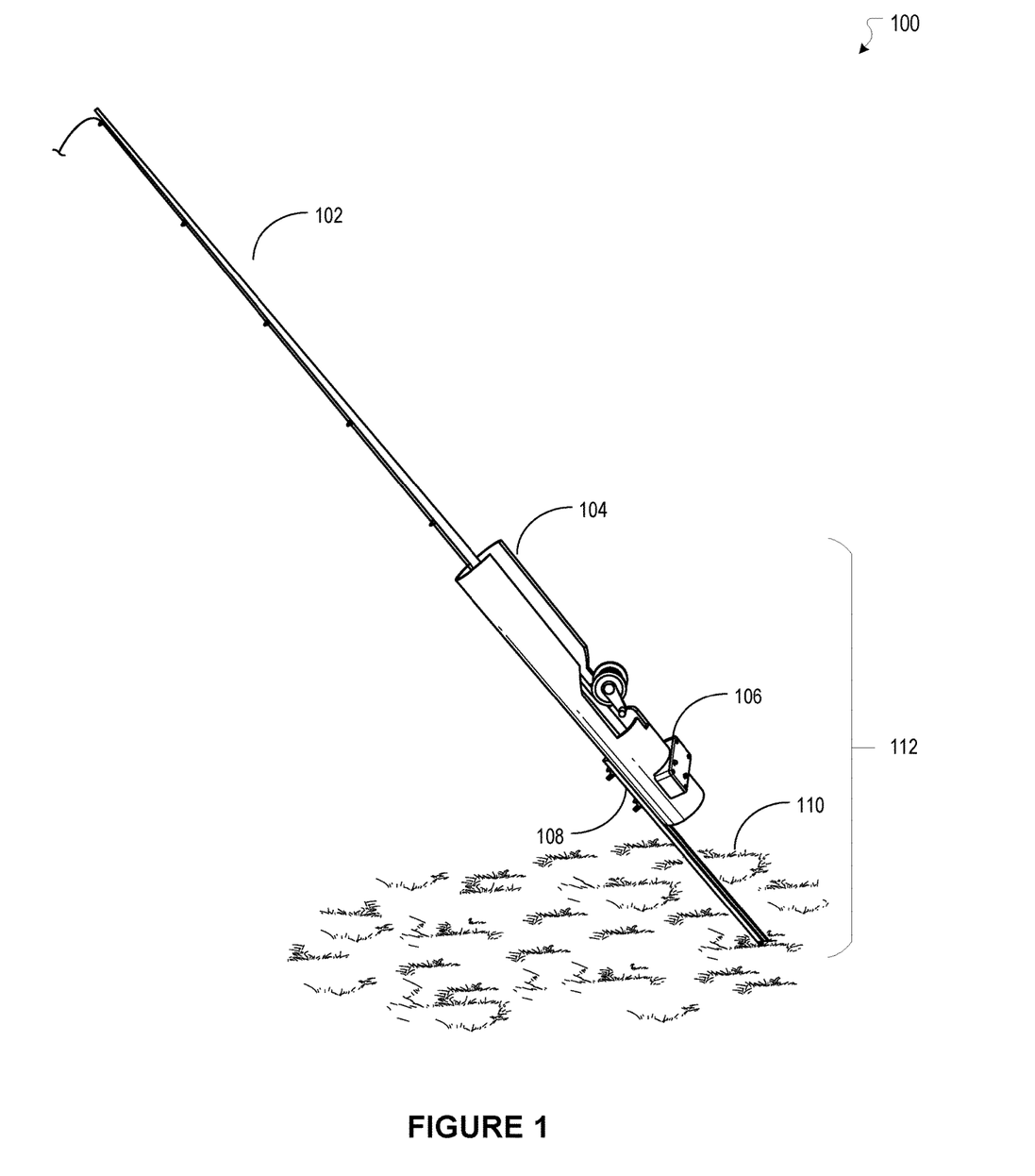
FIG. 1 illustrates an example scenario associated with an example setup of a fish alert tool, in accordance with various embodiments of the present technology.

FIG. 1 illustrates an example scenario 100 associated with an example setup of a fish alert tool 112, in accordance with various embodiments of the present technology. As illustrated in the example scenario 100, a fishing pole 102 that has been baited and cast can be placed in a holder 104 of the fish alert tool 112. In various embodiments, the holder 104 can have a cylindrical shape with openings on both ends of the cylindrical shape. The opening on one end of the cylindrical shape extends down a side of the cylindrical shape. The opening that extends down the side can allow for the fishing pole 102 to be easily placed in the holder 104 and easily removed from the holder 104. The opening that extends down the side can allow for a variety of different fishing poles with, for example, a variety of different reels in different sizes. As illustrated in the example scenario 100, the holder 104 of the fish alert tool 112, which can hold the fishing pole 102, can be supported by a spike 108. In various embodiments, the spike 108 can be attached to the holder 104 with a screw, a bolt, a wingnut, or any other suitable fastener. The spike 108 can be driven into a ground 110. This can allow the holder 104 of the fish alert tool 112 to hold the fishing pole 102 at a desired position or angle. For example, in some cases, it may be desired for the fish alert tool 112 to support the fishing pole 102 at a 45 degree angle from the ground 110. Various angles are possible, and desired angles can vary from user to user. As illustrated in the example scenario 100, the fish alert tool 112 can include an alarm 106. In various embodiments, the alarm 106 can generate an audible alert, such as beeps, whistles, bells, or other sounds. The alarm 106 can also generate a visual alert, such as a flashing light. As illustrated in the example scenario 100, the fish alert tool 112 can be set up by first placing the fish alert tool 112 in the ground 110 at a desired angle. The fishing pole 102 is baited and cast, and then the fishing pole is placed in the holder 104 of the fish alert tool 112. The fish alert tool 112 can be easily removed from the holder 104, for example, in response to an alert from the alarm 106. Many variations are possible.

Figure 2:
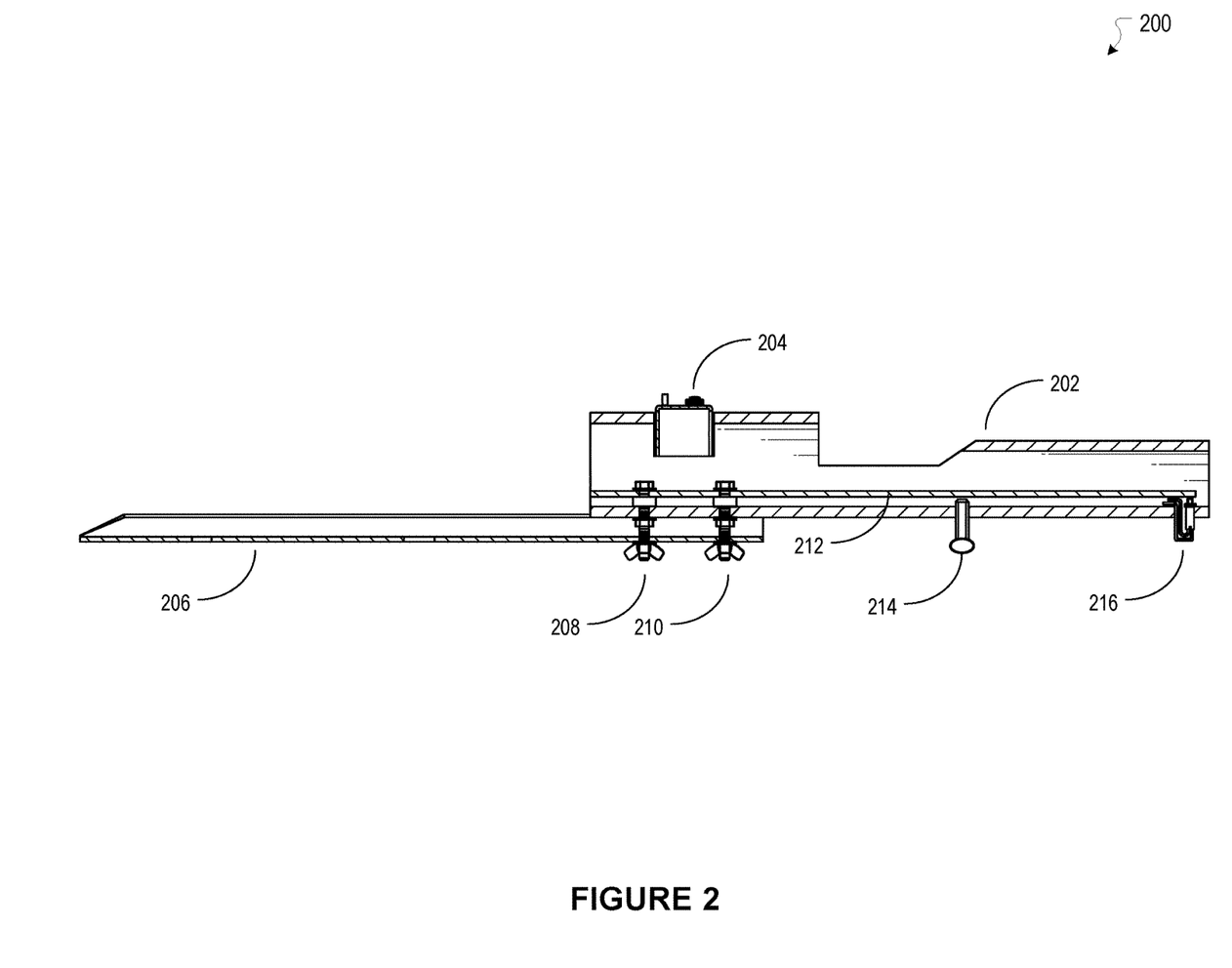
FIG. 2 illustrates an example view of a fish alert tool, in accordance with various embodiments of the present technology.

FIG. 2 illustrates an example side view of a fish alert tool 200, in accordance with various embodiments of the present technology. As illustrated in this example, the fish alert tool 200 can include a holder 202. The holder 202 can have a cylindrical shape with openings on both ends of the cylindrical shape. The opening on one end of the holder 202 can extend down the side of the cylindrical shape. This example illustrates an example side view of the opening that extends down the side of the cylindrical shape. The opening that extends down the side of the cylindrical shape allows a fishing pole to be easily placed and easily removed from the holder 202. While this example illustrates a cylindrical shape, various shapes (e.g., hexagonal, orthogonal, rectangular) can be appropriate. As illustrated in this example, the fish alert tool 200 can include an alarm 204. The alarm 204 can be attached to the holder 202 in a cutout of the holder 202. As illustrated in this example, the fish alert tool 200 can include a spike 206. The spike 206 in this example, is attached by fasteners 208, 210 to the holder 202. The fasteners 208, 210 can be wingnuts or other fasteners that allow the spike 206 to be detached from the holder 202. As further explained in detail herein, the spike 206 can be detached from the holder 202 and reattached in a reversed position, with the spike pointed in the opposite direction of what is illustrated in this example, along the side of the holder 202. This allows for storage of the fish alert tool 200 when not in use. As illustrated in this example, the fish alert tool 200 can include a plate 212. The plate 212 can be within the holder 202 and support a fishing pole placed in the holder 202. The plate 212 can be attached to the holder 202 by the fasteners 208, 210. As the fishing pole is supported by the plate 212, the fishing pole also presses on the plate 212. As illustrated in this example, the fish alert tool 200 can include an adjustable tensioner 214. In some cases, the adjustable tensioner can be a screw or a nut. The adjustable tensioner can be turned, twisted, or otherwise adjusted to adjust the plate 212. As illustrated in this example, the fish alert tool 200 can include a strike detector 216, which can be a button, a sensor, or other suitable detector. The alarm 204 can generate an alert in response to the plate 212 pressing on the strike detector 216. In various embodiments, the alarm 204 can continue to generate the alert while the plate 212 presses on the strike detector 216.

In various embodiments, a fishing pole is placed in the holder 202, where it is supported by the plate 212. By adjusting the adjustable tensioner 214, the plate 212 can be adjusted so that it does not press on the strike detector 216 while supporting the fishing pole. When a fish strikes and pulls on the fishing pole, the pull can allow the fishing pole to press further on the plate 212. This further press can allow the plate 212 to press on the strike detector 216. The adjustable tensioner 214 can be adjusted to achieve a desired sensitivity to fish strikes. The desired sensitivity can correspond with a distance between the plate 212 and the strike detector 216, which can be adjusted by the adjustable tensioner 214. The adjustable tensioner 214 can be adjusted to support the plate 212 further from the strike detector 216 and to reduce sensitivity. The adjustable tensioner 214 can be adjusted to support the plate 212 closer to the strike 216 and to increase sensitivity. With increased sensitivity, a weaker fish strike will allow the plate 212 to press on the strike detector 216 than with reduced sensitivity. In some cases, increased sensitivity may be desirable, for example, when catching smaller fish with weaker strikes than larger fish. In some cases, increased sensitivity may be less desirable, for example, when conditions (e.g., weather, water, etc.) are causing a fishing pole in the holder to move. With reduced sensitivity, a stronger fish strike will allow the plate 212 to press on the strike detector 216 where a weaker fish strike may not be sufficient to allow the plate 212 to press on the strike detector 216. In some cases, reduced sensitivity may be desirable, for example, when catching larger fish with stronger strikes than weaker fish or, for example, when fishing in conditions that cause a fishing pole to move. In some cases, reduced sensitivity may be less desirable as it may allow, for example, a smaller fish to strike without allowing the plate 212 to press on the strike detector 216.

Figure 3:
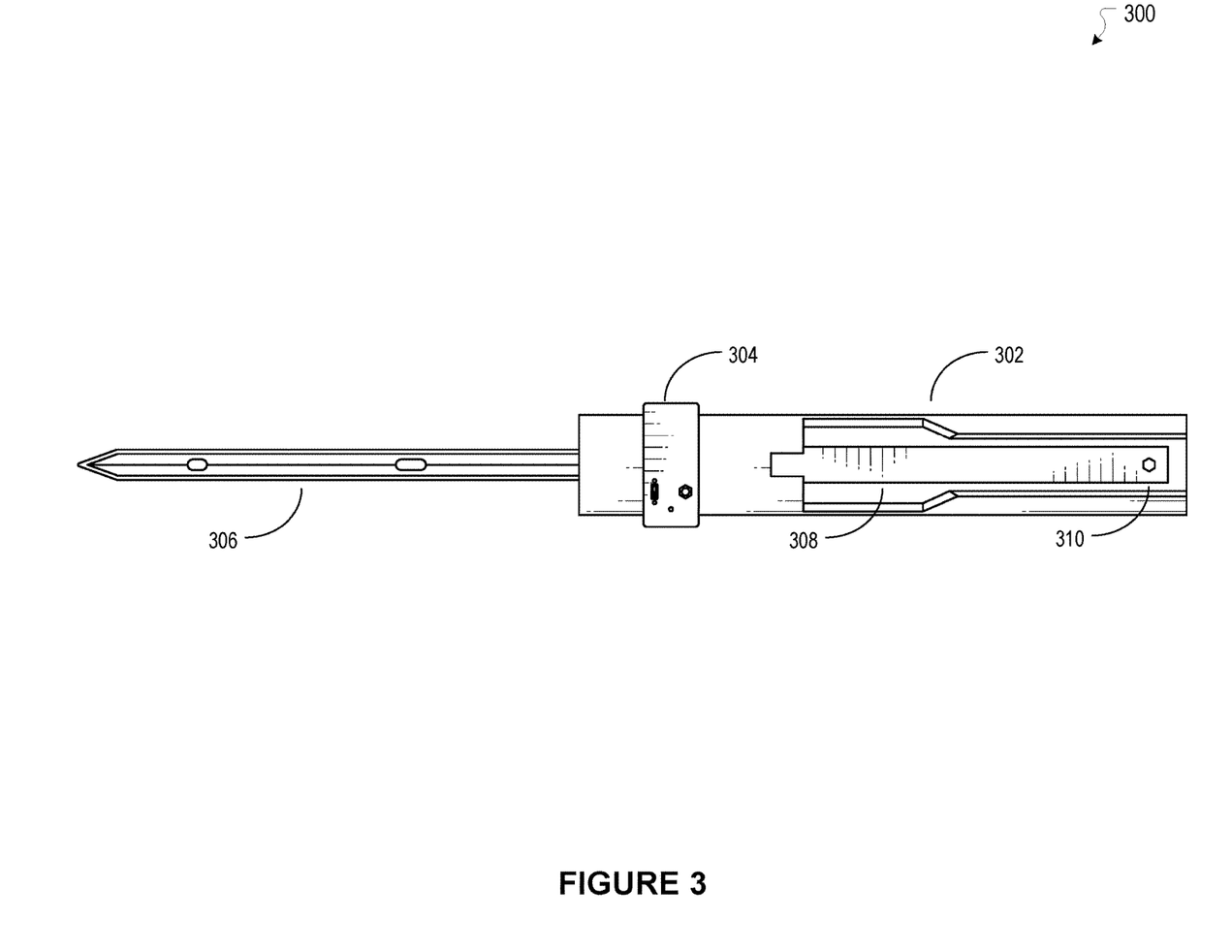
FIG. 3 illustrates an example view of a fish alert tool, in accordance with various embodiments of the present technology.

FIG. 3 illustrates an example top view of a fish alert tool 300, in accordance with various embodiments of the present technology. As illustrated in this example, the fish alert tool 300 can include a holder 302. The holder 302 can have a cylindrical shape with openings on both ends of the cylindrical shape. The opening on one end of the holder 302 can extend down the side of the cylindrical shape. This example illustrates an example top view of the opening that extends down the side of the cylindrical shape. The opening that extends down the side of the cylindrical shape has a shape to provide room for a reel of a fishing pole and allows the fishing pole to be easily placed and easily removed from the holder 302. As illustrated in this example, the fish alert tool 300 can include an alarm 304. The alarm 304 can be attached to the holder 302 in a cutout of the holder 302. As illustrated in this example, the fish alert tool 300 can include a spike 306. The spike 306 can be driven into the ground and allow the holder 304 to hold a fishing pole at a desired angle. As illustrated in this example, the fish alert tool 300 can include a plate 308 and a strike detector 310. A fishing pole can be placed in holder 302 with a grip of the fishing pole oriented toward the spike 306. A reel of the fishing pole can rest in the wider section of the opening that extends down the side of the holder 302. The fishing pole can be supported by the plate 308. As the fishing pole is supported by the plate 308, the fishing pole presses the plate 308 toward the strike detector 310. When a fish strikes, the fish pulls on the tip of the fishing pole, which allows the fishing pole to press harder on the plate 308. This allows the plate 308 to contact the strike detector 310. In response to the plate 308 contacting the strike detector 310, the alarm 304 can generate an alert.

Figure 4A:
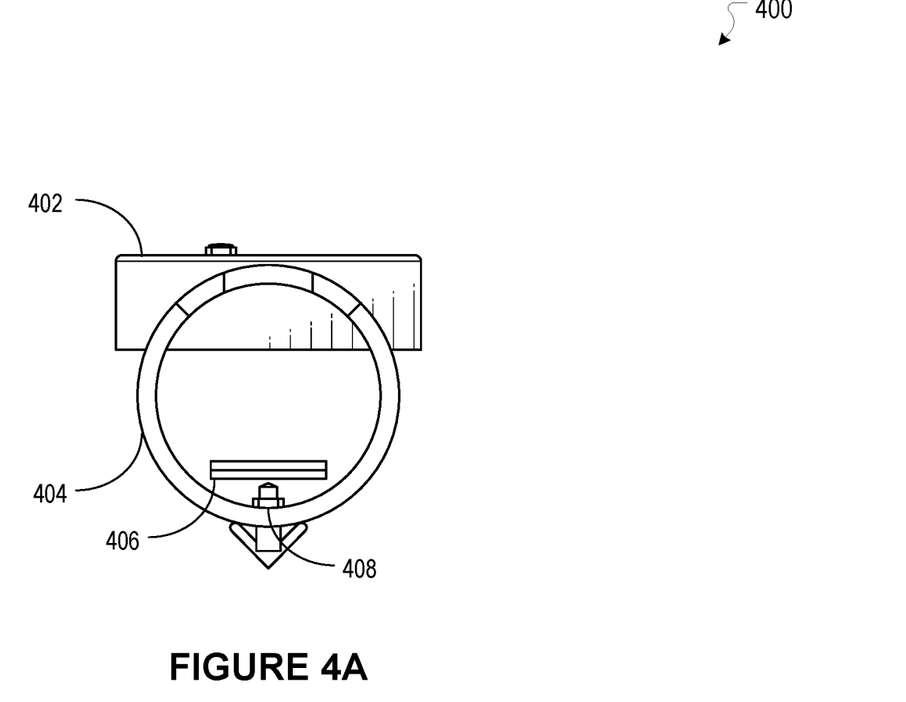
FIGS. 4A-4B illustrate example views of a fish alert tool in a first configuration and a second configuration, in accordance with various embodiments of the present technology.
Figure 4B:
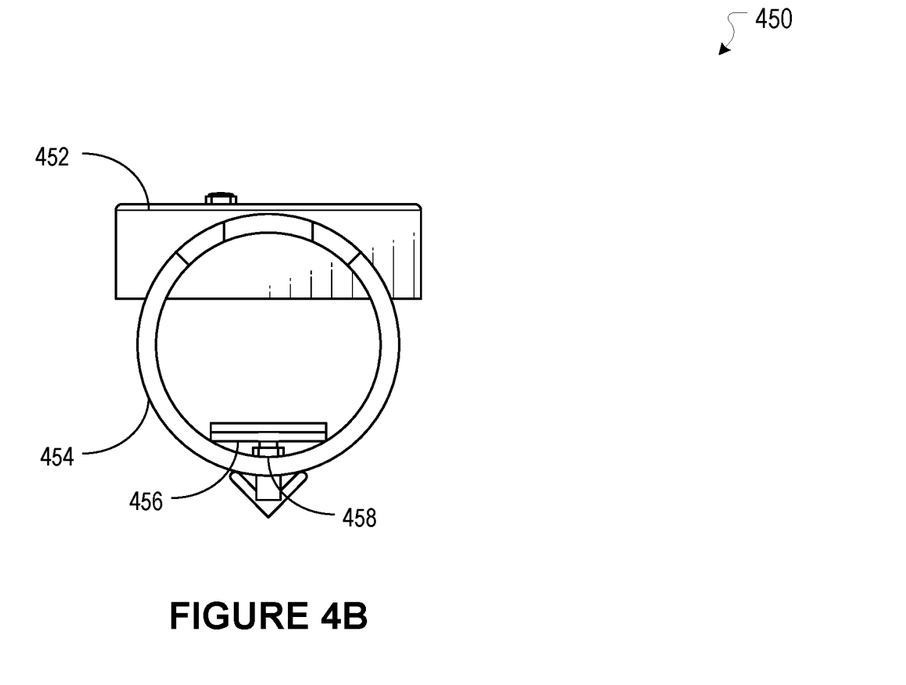

FIGS. 4A-4B illustrate example front views of a fish alert tool in a first configuration 400 and a second configuration 450, in accordance with various embodiments of the present technology. The example front views of the fish alert tool illustrate the effects of a fishing pole pressing on a plate of the fishing alert tool when a fish strikes. While FIGS. 4A-4B illustrate example front views of the fish alert tool in two configurations, it should be understood that there can be various configurations in accordance with the various embodiments described herein.

FIG. 4A illustrates an example front view of a fish alert tool in a first configuration 400, in accordance with various embodiments of the present technology. As illustrated in this example, the fish alert tool can include an alarm 402 attached to a holder 404. The fish alert tool can include a plate 406 and a strike detector 408 in the holder. In the first configuration 400, the plate 406 has been adjusted so that it is just above the strike detector 408. The first configuration 400 can be illustrative of a fish alert tool adjusted with increased sensitivity. For example, a fishing pole can be placed in the holder 404 of the fish alert tool. The fishing pole can rest on the plate 406 and press down on the plate 406 with its weight. With an adjustable tensioner, the plate 406 can be adjusted so that it is just above the strike detector 408. Since the plate 406 is just above the strike detector 408, a weak fish strike can cause the plate 406 to press on the strike detector 408. As such, the first configuration 400 can be illustrative of a fish alert tool adjusted with increased sensitivity. All examples herein are provided for illustrative purposes, and there can be many variations and other possibilities.

FIG. 4B illustrates an example front view of a fish alert tool in a second configuration 450, in accordance with various embodiments of the present technology. As illustrated in this example, the fish alert tool can include an alarm 452 attached to a holder 454. The fish alert tool can include a plate 456 and a strike detector 458 in the holder. In the second configuration 450, the plate 456 presses on the strike detector 458. The second configuration 450 can be illustrative of a fish alert tool where the alarm 452 has been triggered in response to a press on the strike detector 458. For example, a fishing pole can be placed in the holder 454 of the fish alert tool. The fishing pole can rest on the plate 456 and press down on the plate 458. In this example, a fish strike pulls on a tip of the fishing pole. The pull on the tip of the fishing pole can allow the plate 456 to press on the strike detector 458. In response to the press on the strike detector 458, the alarm 452 generates an alert, such as an audible alert and a visual alert. All examples herein are provided for illustrative purposes, and there can be many variations and other possibilities.

Figure 5A:
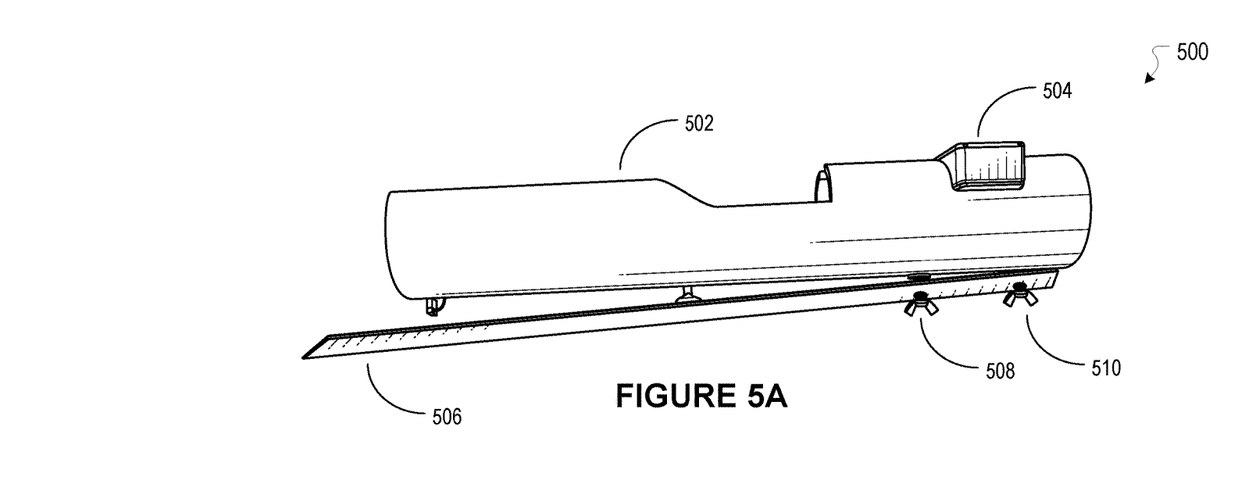
FIGS. 5A-5B illustrate example views of a fish alert tool in a first configuration and a second configuration, in accordance with various embodiments of the present technology.
Figure 5B:
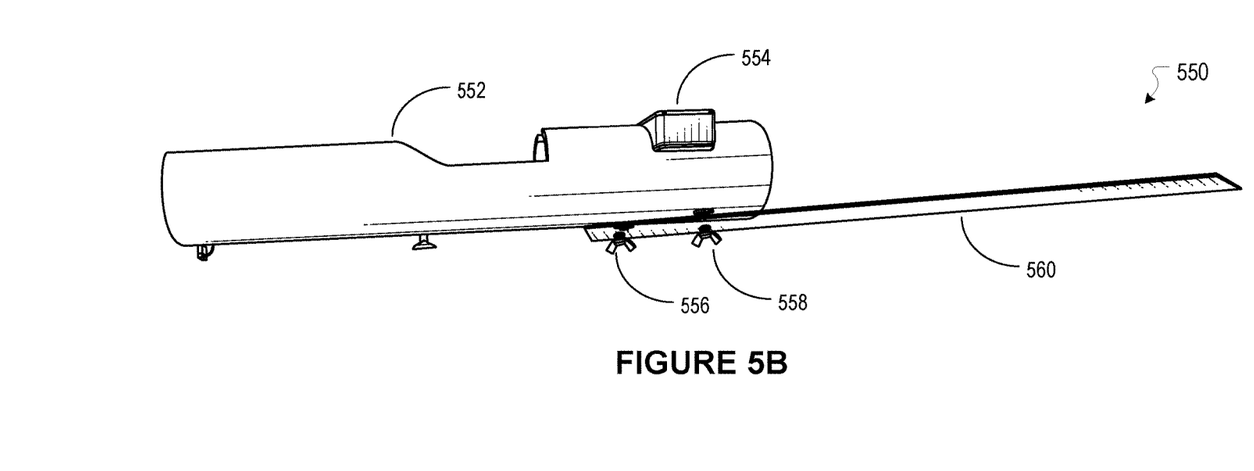

FIGS. 5A-5B illustrate example side views of a fish alert tool in a first configuration 500 and a second configuration 550, in accordance with various embodiments of the present technology. The side views of the fish alert tool illustrate a technique for storing the fish alert tool when it is not in use. While FIGS. 5A-5B illustrate example front views of the fish alert tool in two configurations, it should be understood that there can be various configurations in accordance with the various embodiments described herein.

FIG. 5A illustrates an example side view of a fish alert tool in a first configuration 500, in accordance with various embodiments of the present technology. As illustrated in this example, the fish alert tool can include a holder 502, an alarm 504, and a spike 506. The spike 506 is attached to the holder 502 by fasteners 508, 510. In the first configuration 500, the spike 506 is attached to the holder 502 such that the spike 506 is oriented along the length of the holder 502 as opposed to extending from the holder 502. The first configuration 500 can be illustrative of a fish alert tool configured for storage. For example, a user can store a fish alert tool in the first configuration 500 in a large tackle box. When the user is ready to use the fish alert tool, the user can take the fish alert tool from the large tackle box. The user can remove the spike 506 from the holder 502 and reattach the spike 506 to the holder 502 in an orientation that extends from the holder 502. All examples herein are provided for illustrative purposes, and there can be many variations and other possibilities.

FIG. 5B illustrates an example side view of a fish alert tool in a second configuration 550, in accordance with various embodiments of the present technology. As illustrated in this example, the fish alert tool can include a holder 552, an alarm 554, and a spike 560. The spike 560 is attached to the holder 552 by fasteners 556, 558. In the second configuration, the spike 560 is attached to the holder 552 such that it extends from the holder 552 as opposed to being oriented along the length of the holder 552. The second configuration 550 can be illustrative of a fish alert tool configured for use. For example, if a user has the fish alert tool configured for storage, a user can remove the spike 560 from the holder 552 and reattach the spike 560 in an orientation that extends from the holder 554, as illustrated in the second configuration 550. The user can then use the spike 560 to plant the fish alert tool in the ground. The user can bait and cast a fishing pole and place the fishing pole in the holder 552. All examples herein are provided for illustrative purposes, and there can be many variations and other possibilities.

Figure 6A:
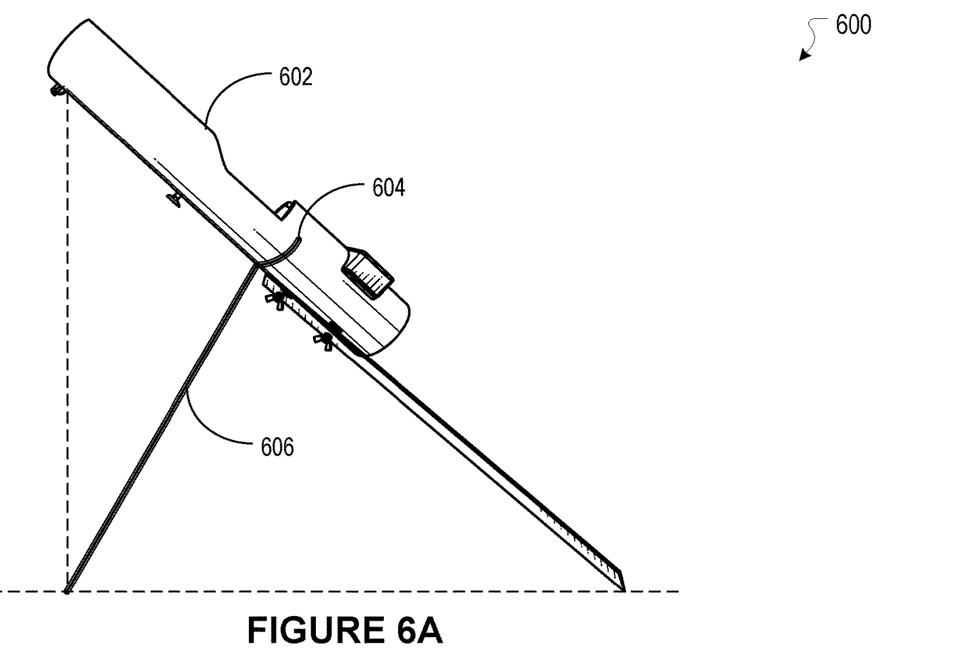
FIGS. 6A-6B illustrate example views of a fish alert tool configured with supporting legs, in accordance with various embodiments of the present technology.
Figure 6B:
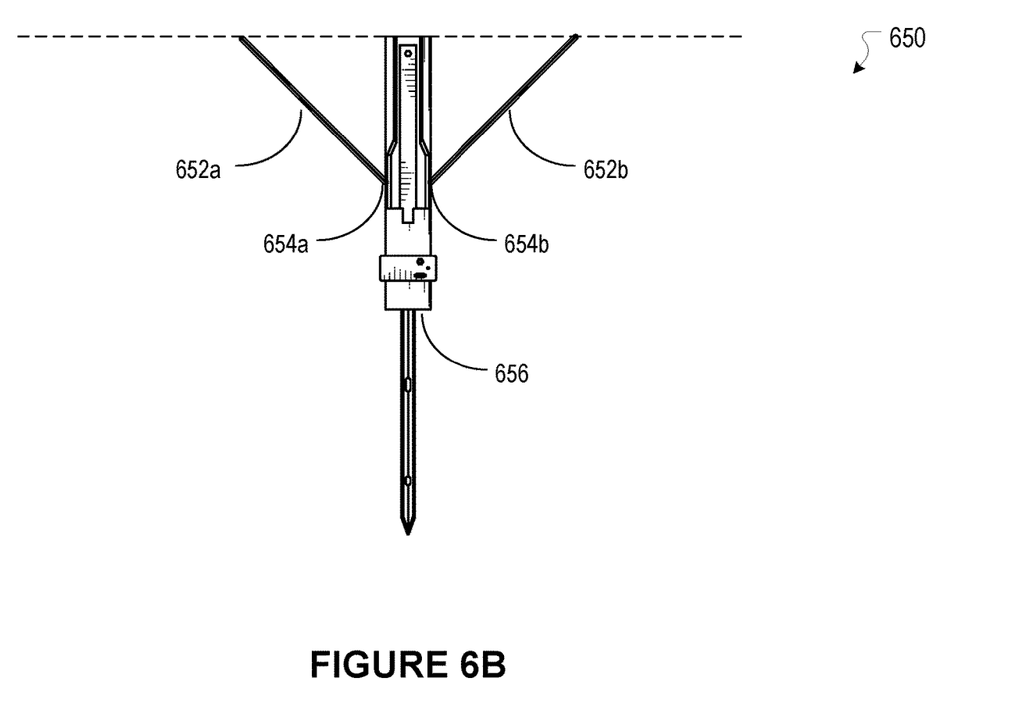

FIGS. 6A-6B illustrate example views 600, 650 of a fish alert tool configured with supporting legs, in accordance with various embodiments of the present technology. The example view 600 illustrates a side view of the fish alert tool using the supporting legs and its spike in a tripod configuration. The example view 650 illustrates a top view of the fish alert tool using the supporting legs and its spike in a tripod configuration. While FIGS. 6A-6B illustrate example views of the fish alert tool in a tripod configuration, it should be understood that there can be various configurations in accordance with the various embodiments described herein.

FIG. 6A illustrates an example view 600 of a fish alert tool configured with supporting legs, in accordance with various embodiments of the present technology. As illustrated in this example, the fish alert tool includes a holder 602 and supporting legs 606. The supporting legs 606 are attached to a harness 604. The supporting legs 606 support the holder 604 with the harness 604. In various embodiments, the supporting legs 606 and the harness 604 can be separate from the holder 602. In cases where additional support is desired, the supporting legs 606 and the harness 604 can be used to provide additional support to the holder 604. In cases where the additional support is not desired, the supporting legs 606 and the harness 604 can be stored separately while a spike is used to support the holder 604. As illustrated in the example view 600, the additional support provided by the supporting legs 606 and the harness 604 can add stability to the holder 602 and reduce a possibility of false alarms due to the holder 602 shaking. Further, as illustrated in the example view 600, the additional support provided by the supporting legs 606 and the harness 604 can allow the holder 604 to maintain a broader range of angles from the ground while maintaining stability. For example, a user may desire the holder 604 to be placed at a 45 degree angle with the ground. In this example, the ground may be too soft to support the holder 604 at a 45 degree angle with the ground. The supporting legs 606 and the harness 604 can be used in this example to provide stability so that the holder 604 does not fall while maintaining a 45 degree angle with the ground. All examples herein are provided for illustrative purposes, and there can be many variations and other possibilities.

FIG. 6B illustrates an example view 650 of a fish alert tool configured with supporting legs, in accordance with various embodiments of the present technology. As illustrated in this example, the fish alert tool includes a holder 656 and supporting legs 652a, 652b. The supporting legs 652a, 652b are attached to a harness with extrusions 654a, 654b. The supporting legs 652a, 652b support the holder 656 with the harness with extrusions 654a, 654b that hold the holder 656 on either sides of the holder 656. In some cases, a spike is sufficient to support the holder 604 and a fishing pole placed in the holder 604. In these cases, the supporting legs 606 and the harness 604 may still provide additional support to the holder 604. Depending on preferences of a user, the supporting legs 606 and the harness 604 may or may not be used in these cases. In some cases, a spike may not fully support the holder 604 and a fishing pole placed in the holder 604. For example, the ground may be soft, wet, or sandy. In other cases, a spike may not be able to be placed in the ground. For example, a user may be fishing on concrete or wood. Thus, the supporting legs 606 and the harness 604 can be advantageous in various situations and provide additional support for the holder 602. All examples herein are provided for illustrative purposes, and there can be many variations and other possibilities.

Figure 7:
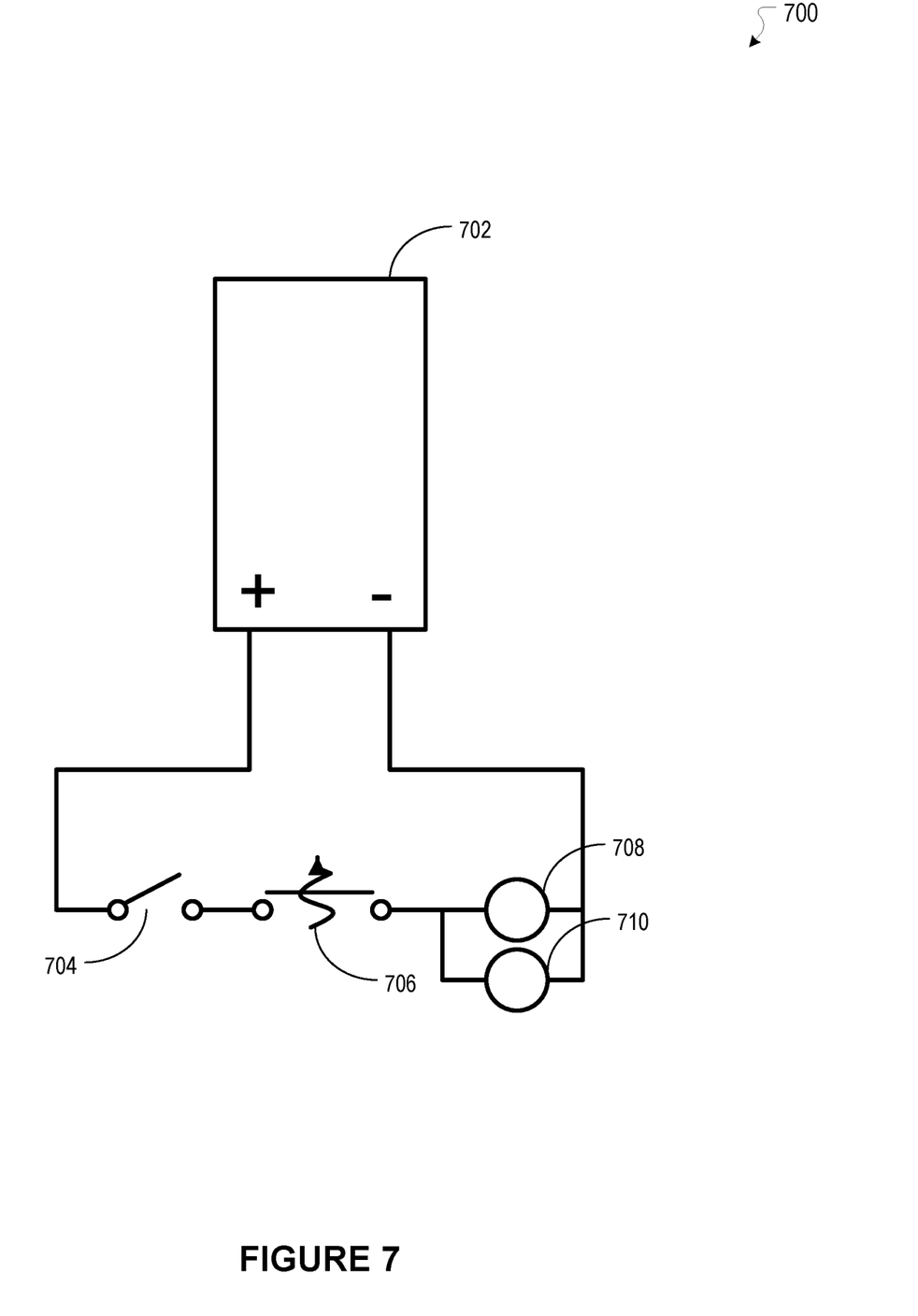
FIG. 7 illustrates an example wiring diagram of an alarm of a fish alert tool, in accordance with various embodiments of the present technology.

FIG. 7 illustrates an example wiring diagram 700 of an alarm of a fish alert tool, in accordance with various embodiments of the present technology. As illustrated in this example, the alarm of the fish alert tool can include a battery 702. The battery can be wired to an on-off switch 704, a push button 706, an audible alarm 708, and a visual alarm 710. In various embodiments, the push button 706 can be implemented as a strike detector, as described herein. When the on-off switch 704 is switched on and the push button 706 is activated, then the battery 702 can provide power to the audible alarm 708 and the visual alarm 710. The audible alarm 708 and the visual alarm 710 can generate an audio alert and a visual alert in response to the on-off switch 704 being switched on and the push button 706 being activated. For example, the fish alert tool can be set up with a fishing pole resting in its holder. The on-off switch 704 of the alarm of the fish alert tool can be switched on. A plate in the fish alert tool can be adjusted with an adjustable tensioner to an appropriate sensitivity. When a fish strikes, the plate in the fish alert tool can press on a strike detector, or the push button 706, in the fish alert tool. In response to the on-off switch 704 being on and the push button 706 being pressed, the audible alarm 708 and the visual alarm 710 of the alarm of the fish alert tool can generate an audible alert and a visual alert. While the example wiring diagram 700 illustrates generation of an audible alert and a visual alert, it should be understood that various alerts can be generated. For example, an alert can be generated by Bluetooth or other wireless signal to a device that, in response to the wireless signal, generates the alert. Other forms of alerts are possible as well. For example, a vibration alert can be generated. All examples herein are provided for illustrative purposes, and there can be many variations and other possibilities.

Methods described herein may vary in accordance with the present disclosure. Various embodiments of this disclosure may repeat one or more steps of the methods described herein, where appropriate. Although this disclosure describes and illustrates particular steps of certain methods as occurring in a particular order, this disclosure contemplates any suitable steps of the methods occurring in any suitable order or in any combination which may include all, some, or none of the steps of the methods. Furthermore, although this disclosure may describe and illustrate particular components, apparatuses, devices, or systems carrying out particular steps of a method, this disclosure contemplates any suitable combination of any suitable components, devices, or systems carrying out any suitable steps of the method.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, modules, elements, feature, functions, operations, or steps, any of these embodiments may include any combination or permutation of any of the components, modules, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

While various embodiments of the present technology have been described above, it should be understood that they have been presented by way of example only, and not of limitation. Likewise, the various diagrams may depict an example architectural or other configuration for the disclosed technology, which is done to aid in understanding the features and functionality that can be included in the disclosed technology. The present technology is not restricted to the illustrated example architectures or configurations, but the desired features can be implemented using a variety of alternative architectures and configurations. Indeed, it will be apparent to one of skill in the art how alternative configurations can be implemented to implement the desired features of the technology disclosed herein. Additionally, with regard to operational descriptions and method claims, the order in which the steps are presented herein shall not mandate that various embodiments be implemented to perform the recited functionality in the same order unless the context dictates otherwise.

Although the present technology is described above in terms of various example embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the present technology, whether or not such embodiments are described and whether or not such features are presented as being a part of a described embodiment. Thus, the breadth and scope of the technology disclosed herein should not be limited by any of the above-described example embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. The presence of broadening words and phrases such as "one or more," "at least," "but not limited to" or other like phrases in some instances shall not be read to mean that the narrower case is intended or required in instances where such broadening phrases may be absent.

What is claimed is:

1. A device comprising:
   a plate that supports a fishing pole;
   a detector that detects a fish strike based on a press from the plate onto the detector in response to a pull on the fishing pole;
   an alarm that generates an alert in response to the fish strike detected by the detector;
   a holder where the fishing pole is placed, wherein the holder has an opening on the side of the holder, wherein the opening has a shape to provide room for a reel of the fishing pole, and wherein the plate, the detector, and the alarm are attached to the holder, the plate and the detector within the holder; and
   one or more supporting legs and a harness that supports the holder.

2. The device of claim 1, wherein the holder has a cylindrical shape with two openings, and wherein one of the two openings extends along the side of the cylindrical shape.

3. The device of claim 1, further comprising:
   a spike that is attached to the holder by at least one fastener.

4. The device of claim 3, wherein the spike is removeable from the holder and re-attachable to the holder, wherein the spike is re-attachable in a first configuration wherein the spike is oriented along the length of the holder or a second configuration wherein the spike extends from the holder.

5. The device of claim 3, wherein the spike and the plate are attached to the holder by the at least one fastener.

6. The device of claim 1, wherein the harness comprises:
   one or more extrusions that hold the holder while the holder is supported.

7. The device of claim 1, further comprising:
   an adjustable tensioner that adjusts a distance between the plate and the detector, wherein the adjustable tensioner is attached to the holder.

8. The device of claim 7, wherein the distance between the plate and the detector is adjusted by turning the adjustable tensioner.

9. The device of claim 7, wherein a sensitivity of the detector corresponds with the distance between the plate and the detector.

10. The device of claim 1, wherein the alarm continues to generate the alert while the plate presses on the detector.

11. The device of claim 1, wherein the detector comprises:
    a push button, wherein the fish strike is detected based on a press on the push button from the plate.

12. The device of claim 1, wherein the plate presses on the detector based on a fish strike on a tip of the fishing pole.

13. An alarm device attached to a holder where a fishing pole is placed, wherein the holder has an opening on the side of the holder, wherein the opening has a shape to provide room for a reel of the fishing pole, the alarm device comprising:
    a battery;
    an on-off switch wired to the battery;
    a push button wired to the on-off switch; and
    at least one of: an audible alarm or a visual alarm wired to the push button, wherein the push button activates in response to a press from a plate within the holder in response to a pull on the fishing pole.

14. The alarm device of claim 13, wherein the holder is further attached to a plate that supports a fishing pole and one or more supporting legs and a harness that supports the holder.

15. The alarm device of claim 14, wherein the at least one of: the audible alarm or the visual alarm activates in response to the activation of the push button.

16. The alarm device of claim 15, further comprising:
    an adjustable tensioner that adjusts a distance between the plate and the push button, wherein the adjustable tensioner is attached to the holder.

17. The device of claim 16, wherein a sensitivity of the push button corresponds with the distance between the plate and the push button.

18. The alarm device of claim 14, wherein the plate presses on the push button based on a pull from the fish strike on a tip of the fishing pole.

19. The alarm device of claim 13, wherein the audible alarm generates at least one of: a beep, a whistle, or a bell sound.

20. The alarm device of claim 13, wherein the visual alarm generates a flashing light.

\* \* \* \* \*